CARBOXYALKYLMERCAPTOMETHYL SILOXANES

Hans Niederprüm, Monheim, and Walter Simmler, Cologne-Mulheim, Germany, assignors to Farbenfabriken Bayer Aktiengesellschaft, Leverkusen, Germany, a corporation of Germany
No Drawing. Filed July 23, 1964, Ser. No. 384,770
Claims priority, application Germany, July 24, 1963, F 40,332
2 Claims. (Cl. 260—448.2)

ABSTRACT OF THE DISCLOSURE

A novel class of carbofunctional organopolysiloxanes is disclosed, the same being suitable for use as levelling agents for polyester lacquers, as lubricants and as additives for water soluble or emulsifiable drilling and cutting oils. The carbofunctional organo-polysiloxanes correspond to the formula $$R_nSiO_{\frac{4-n}{2}}$$

wherein $n$ has a value greater than 1 but not exceeding 3, at least one of the siloxane units is a mercaptomethylsiloxane unit having the following formula

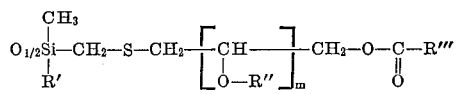

and each substituent R of all remaining siloxane units is alkyl or aryl, in the said mercaptomethyl-siloxane units R' is $CH_3$ or $O_{1/2}$, R'' is H or

$m$ is either 0 or 1, and

is acyl which is derived from a mono- or poly-basic saturated or unsaturated aliphatic, cycloaliphatic or aromatic carboxylic acid, or carbonic acid.

---

The invention relates to novel carbofunctional organopolysiloxane compounds and a process for the production thereof.

These compounds have the average formula $$R_nSiO_{\frac{4-n}{2}}$$

wherein the number $n$ is greater than 1 and at most equal to 3, at least one of the substituents R is a carboxyalkylmercaptomethyl radical more closely defined in the following, and all other substituents R are alkyl or aryl radicals including indifferently substituted alkyl or aryl radicals, preferably methyl radicals alone, or methyl and phenyl radicals. In these organo-polysiloxanes according to the invention the carboxyalkylmercaptomethyl-substituted siloxane units correspond to the general formula

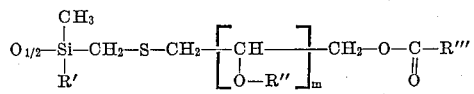

In this formula,
R'=$CH_3$ or $O_{1/2}$
R''=H or

$m$=0 or 1

is an acyl radical which derives from a mono- or polybasic, optionally indifferently substituted, saturated or unsaturated, aliphatic, cycloaliphatic or aromatic carboxylic acid, including carbonic acid, and which in relation to the other acid functions may be free, chlorinated, or esterified with a mono- or poly-hydric aliphatic alcohol, a polyalkylene glycol, a polyalkylene glycol monoalkyl ether or a hydroxyalkylmercaptomethyl siloxane unit of the foregoing structure.

The aforesaid new esterified organosiloxanes are very useful surface active additives; more particularly, they are applicable as levelling agents, especially for polyester lacquers, and as lubricants, especially as additives for water-soluble or water-emulsifiable drilling and cutting oils.

For the manufacture of the products described above, according to the present invention a β-hydroxyethylmercaptomethyl siloxane or a β-, γ-dihydroxypropylmercaptomethyl siloxane is reacted with the chloride or anhydride of a carboxylic acid which may be mono- or poly-basic, saturated or unsaturated aliphatic, cycloaliphatic or aromatic, including indifferently substituted carboxylic acids, and optionally with a mono- or poly-hydric aliphatic alcohol, a polyalkylene glycol or a polyalkylene glycol monoalkyl ether, at a temperature between —10 and +150° C. in the presence of a tertiary nitrogen base, for example pyridine or triethylamine. Inert solvents, especially benzene or toluene, can be used in addition. In the case of sufficiently reactive acid anhydrides, the addition of a nitrogen base may be dispensed with.

The hydroxyalkylmercaptomethyl siloxanes used in the process just described have the average formula $$X_nSiO_{\frac{4-n}{2}}$$

In this formula the number $n$ is greater than 1 and at most equal to 3. At least one of the siloxane units of these polysiloxanes has the formula

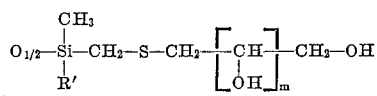

wherein R'=$CH_3$ or $O_{1/2}$, and $m$=0 or 1. In all other siloxane units the substituents X are alkyl or aryl radicals including indifferently substituted alkyl or aryl radicals, preferably methyl radicals alone, or methyl and phenyl radicals.

Polysiloxanes of this type are obtained, for example, by reacting bromomethyl-substituted silanes or siloxanes with β-hydroxyethylmercaptan or 1-thioglycerol, as described in more detail in U.S. patent application Serial Numbers 286,909 and 329,875, filed June 11, 1963, by Simmler and Niederprüm, and December 11, 1963, by Simmler, Niederprüm, and Jonas, respectively.

As examples of the acyl chlorides and acid anhydrides the following may be mentioned: phosgene, acetyl chloride, monochloroacetyl chloride, propionyl chloride, isovaleryl chloride, stearic acid chloride, methacrylic acid chloride, oleic acid chloride, oxalyl chloride, succinyl chloride, benzoyl chloride, 4-chlorobenzoyl chloride, 4-methoxybenzoyl chloride, 3,5-dinitrobenzoyl chloride, p-toluic acid chloride, 4-nitrophenylacetyl chloride, phthalyl chloride, terephthalyl chloride, anthraquinonecarboxylic acid-(2)-chloride; acetic anhydride, methoxyaceticanhydride, propionic acid anhydride, succinic acid anhydride, maleic acid anhydride, tetrapropenylsuccinic acid anhydride, hexahydrophthalic acid anhydride, 1,2,3,6-tetrahydrophthalic acid anhydride, benzoic acid anhydride, phthalic acid anhydride, tetrachlorophthalic acid anhydride, benzenetetracarboxylic acid-(1,2,4,5)-anhydride and naphthalene-dicarboxylic acid-(1,8)-anhydride.

The amounts of the reactants may be chosen in such a proportion that the number of hydroxyl groups contained in the hydroxyalkylmercaptomethyl siloxane equals the number of acyl radicals contained in the carboxylic acid derivative, or that the one or the other is present in excess so that part thereof remains unaltered in the end product.

The following examples are given for the purpose of illustrating the invention, the percentages are percent by weight.

*Example 1*

320 grams of a tris-($\beta$-hydroxyethylmercaptomethyl)-polymethyl siloxane which, with a 2.9% hydroxyl content, corresponds approximately to the formula

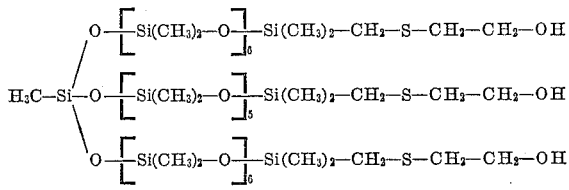

is mixed with 300 cm.³ anhydrous toluene and 67 g. acetic anhydride, and the mixture is heated at boiling temperature under reflux for 5 hours. The solvent is then evaporated by heating at 2 mm. Hg at 90° C., and the residue is filtered. A clear, almost colourless oil results as filtrate, which contains 5% S and 5.3% $CH_3CO$. At 20° C. its density is 1.025 g./cm.³, its viscosity 30.4 cp. and its refractive index $n_D^{20}=1.4293$.

*Example 2*

315 grams of a tris-($\beta$-hydroxyethylmercaptomethyl)-polymethyl siloxane which, with a 2.7% hydroxyl content, corresponds approximately to the formula:

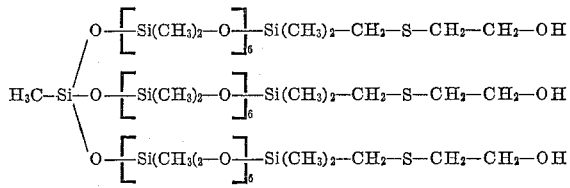

containing 0.5 mol OH, is mixed with 300 cm.³ anhydrous benzene and 39.5 g. (0.5 mol) pyridine. A solution of 39 g. (0.5 mol) acetyl chloride in 100 cm.³ benzene is added dropwise with stirring at room temperature and stirring is continued for 2 hours. The precipitated pyridinium chloride is then separated by filtration, the solvent is evaporated from the filtrate by heating at 1 mm. Hg at 80° C., and the residue is again filtered. A clear, colourless oil is obtained as filtrate of which the infra-red and the nuclear magnetic resonance spectra are the same as those of the product of Example 1. At 20° C. its density is 1.025 g./cm.³, its viscosity 34.5 cp. and its refractive index $n_D^{20}=1.4293$.

*Example 3*

207 grams of a tris-($\beta,\gamma$-dihydroxy-n-propylmercaptomethyl)-polymethyl siloxane which, with a 4.1% hydroxyl content, corresponds approximately to the formula

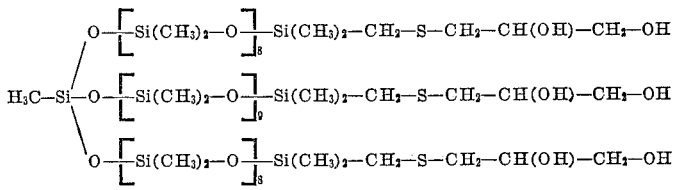

containing 0.5 mol OH, is mixed with 500 cm.³ benzene, 50 g. pyridine and 78 g. (0.6 mol) propionic acid anhydride, and the mixture is heated at boiling temperature under reflux for 2 hours. The solvent is then evaporated by heating up to 80° C. at 1 mm. Hg and the residue is filtered. The filtrate is a yellowish oil of saponification value 124, containing 3.5% sulphur. At 20° C. its density is 1.035 g./cm.³, its viscosity 76.6 cp. and its refractive index $n_D^{20}=1.4283$.

*Example 4*

494 grams of an $\alpha,\omega$-bis($\beta'$-hydroxyethylmercaptomethyl)-polydimethyl siloxane which, with a 2.8% hydroxyl content, corresponds approximately to the formula

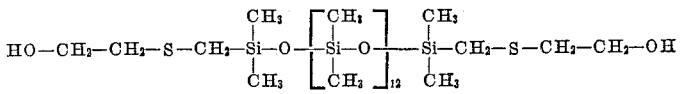

containing 0.814 mol OH, is mixed with 500 cm.³ anhydrous benzene and 77 g. (0.976 mol) pyridine (20% excess). The mixture is reacted with a solution of 52 g. (0.407 mol) oxalyl chloride in 200 cm.³ benzene in a manner analogous to that described in Example 2, and the further procedure there described is followed. A vicous oil is obtained of saponification value 86, containing 4.8% sulphur. At 20° the density is 1.035 g./cm.³, its viscosity 1767 cp. and its refractive index $n_D^{20}=1.4343$.

*Example 5*

243 grams of the same polysiloxane as employed in Example 4, containing 0.4 mol OH, is mixed with 300 cm.³ toluene and 48 g. (0.48 mol) succinic acid anhydride and the mixture is heated at boiling temperature under reflux for 5 hours. The solvent is then evaporated by heating up to 100° C. at 200 mm. Hg and the residue is filtered. The filtrate is a viscous oil of saponification value 149 and acid number 78, which contains 4.7% sulphur. At 20° C. its density is 1.055 g./cm.³, its viscosity 206 cp. and its refractive index $n_D^{20}=1.4365$.

*Example 6*

405 grams of an $\alpha,\omega$-bis-($\beta'$-hydroxyethylmercaptomethyl)-polydimethyl siloxane which, with a 2.1% hydroxyl content, corresponds approximately to the formula

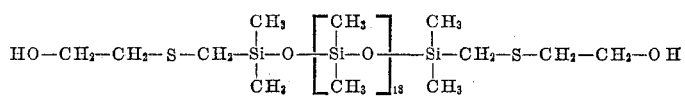

containing 0.5 mol OH, is mixed with 400 cm.$^3$ benzene and 39 g. pyridine. The mixture is reacted with a solution of 31 g. (0.2 mol) succinyl chloride in 100 cm.$^3$ benzene in a manner analogous to that described in Example 2 and the further procedure followed as there described. A viscous oil results, of saponification value 60, which contains 4% sulphur and less than 0.1% of hydroxyl groups. At 20° C. its density is 1.025 g./cm.$^3$, its viscosity 582 cp. and its refractive index $n_D^{20}=1.4285$.

Example 7

315 grams of the same polysiloxane as that employed in Example 2, containing 0.5 mol OH, is mixed with 300 cm.$^3$ benzene and 39 g. pyridine. The mixture is reacted with a solution of 52 g. (0.5 mol) methacrylic acid chloride in 100 cm.$^3$ benzene in a manner analogous to that described in Example 2, and the further procedure is the same as that there described. A clear oil is obtained of saponification value 81, which contains 4.8% sulphur. At 20° C. its density is 1.02 g./cm.$^3$, its viscosity 45 cp. and its refractive index $n_D^{20}=1.4368$.

Example 8

43 grams of the same polysiloxane as that employed in Example 4, containing 0.4 mol OH, is mixed with 300 cm.$^3$ toluene and 47 g. (0.48 mol) maleic acid anhydride, and the further procedure is the same as that of Example 1. A viscous oil of acid number 58 results which contains 4.9% sulphur. At 20° C. its density is 1.05 g./cm.$^3$, its viscosity 476 cp. and its refractive index $n_D^{20}=1.4391$.

Example 9

315 grams of the same polysiloxane as that employed in Example 2 containing 0.5 mol OH, is mixed with 300 cm.$^3$ benzene and 39 g. pyridine. The mixture is reacted with a solution of 70 g. (0.5 mol) benzoyl chloride in 100 cm.$^3$ benzene in the manner analogous to that described in Example 2, and the further procedure there described is followed. A clear oil is obtained of saponification value 82, which contains 4.7% sulphur. At 20° C. its density is 1.045 g./cm.$^3$, its viscosity 63.7 cp. and its refractive index $n_D^{20}=1.4530$.

Example 10

252 grams of the same polysiloxane as that employed in Example 2, containing 0.4 mol OH, are mixed with 400 cm.$^3$ toluene and 60 g. (0.4 mol) phthalic acid anhydride and the further procedure of Example 1 is followed. The product is a viscous oil of saponification value 149 and acid number 65 (hydroxyl number=0), which contains 4.5% sulphur. At 20° C. its density is 1.075 g./cm.$^3$, its viscosity 542 cp. and its refractive index $n_D^{20}=1.4575$.

Example 11

405 grams of the same polysiloxane as that employed in Example 6, containing 0.5 mol OH, is mixed with 400 cm.$^3$ benzene and 39 g. pyridine. The mixture is reacted with a solution of 41 g. (0.2 mol) terephthalic acid chloride in 100 cm.$^3$ benzene in a manner analogous to that of Example 2 and the further procedure there described is followed. A viscous oil results of saponification value 55, which contains 3.6% sulphur and 0.2% terminal hydroxyl groups. At 20° C. its density is 1.02 g./cm.$^3$, its viscosity 870 cp. and its refractive index $n_D^{20}=1.4372$.

Example 12

370 grams of a tris-($\beta$-hydroxyethylmercaptomethyl)-polymethyl siloxane which, with a 2.3% hydroxy content, corresponds approximately to the formula $$H_3C-Si \begin{cases} O-[Si(CH_3)_2-O]_8-Si(CH_3)_2-CH_2-S-CH_2-CH_2-OH \\ O-[Si(CH_3)_2-O]_7-Si(CH_3)_2-CH_2-S-CH_2-CH_2-OH \\ O-[Si(CH_3)_2-O]_8-Si(CH_3)_2-CH_2-S-CH_2-CH_2-OH \end{cases}$$

containing 0.5 mol OH, is mixed with 1400 cm.$^3$ benzene, 95 g. (1.2 mol) pyridine and 773 g. of an anhydrous polyalkylene glycol mono-n-butyl ether containing 1.1% hydroxyl groups, i.e. altogether likewise 0.5 mol OH, the oxyalkylene chain being formed in equal parts by weight from ethylene oxide and propylene oxide. The mixture is reacted with a solution of 70 g. (0.55 mol) oxalyl chloride in 300 cm.$^3$ benzene in a manner analogous to that described in Example 2, and the further procedure there described is followed. A viscous oil is obtained of saponification value 52, containing 8.7% Si and 1.5% S. At 20° C. its density is 1.06 g./cm.$^3$, its viscosity 2500 cp. and its refractive index $n_D^{20}=1.4515$.

What is claimed is:

1. A carbofunctional organo-polysiloxane compound of the average formula $$R_nSiO_{\frac{4-n}{2}}$$

wherein $n$ is a number greater than 1 and at most equal to 3, at least one of the siloxane units is a mercaptomethylsiloxane unit having the formula $$O_{1/2}-\underset{R'}{\underset{|}{Si}}-CH_2-S-CH_2-\left[\underset{O-R''}{\underset{|}{CH}}-\right]_m CH_2-O-\underset{O}{\underset{\|}{C}}-R'''$$

and each substituent R of all remaining siloxane units is a radical selected from the group consisting of alkyl, aryl, indifferently substituted alkyl and indifferently substituted aryl, in the said mercaptomethyl-siloxane units R' being a member selected from the group consisting of $CH_3$ and $O_{1/2}$, R'' being a member selected from the group consisting of H and $$-\underset{O}{\underset{\|}{C}}-R'''$$

$m$ being a number selected from the group consisting of 0 and 1, and $$-\underset{O}{\underset{\|}{C}}-R'''$$

being an acyl radical which is derived from a carboxylic acid selected from the group consisting of mono- and poly-basic saturated and unsaturated aliphatic, cycloaliphatic and aromatic carboxylic acids, and carbonic acid.

2. A carbofunctional organo-polysiloxane compound of the average formula $$R_nSiO_{\frac{4-n}{2}}$$

wherein n is a number greater than 1 and at most equal to 3, at least one of the siloxane units is a mercaptomethylsiloxane unit having the formula $$O_{1/2}-\underset{R'}{\underset{|}{Si}}-CH_2-S-CH_2-\left[\underset{O-R''}{\underset{|}{CH}}-\right]_m CH_2-O-\underset{O}{\underset{\|}{C}}-R'''$$

and each substituent R of all remaining siloxane units is a radical selected from the group consisting of alkyl, aryl, indifferently substituted alkyl and indifferently substituted aryl, in the said mercaptomethylsiloxane units R' being a member selected from the group consisting of $CH_3$ and $O_{1/2}$, R'' being a member selected from the group consisting of H and $$-\underset{O}{\underset{\|}{C}}-R'''$$

$m$ being a number selected from the group consisting of 0 and 1, and $$-\underset{O}{\underset{\|}{C}}-R'''$$

being an acyl radical which is derived from a carboxylic acid selected from the group consisting of poly-basic saturated and unsaturated aliphatic, cycloaliphatic and aromatic carboxylic acids, and carbonic acid, at least one of the carboxy groups of the said carboxylic acid being substituted by a member selected from the group consisting of chlorine and ester radicals of mono- and poly-hydric aliphatic alcohols, polyalkylene glycols, poly-alkylene glycol monoalkyl ethers and hydroxyakylmercaptomethyl siloxane units of the foregoing defined structure.

References Cited

UNITED STATES PATENTS 2,947,772  8/1960  Eynon et al. ----- 260—448.2 X

FOREIGN PATENTS 1,378,592  12/1963  France.

OTHER REFERENCES

Noller, "Chemistry of Organic Compounds," 2nd edition, pp. 152, 161, 163, W. B. Saunders Co., Philadelphia (1957).

HELEN M. McCARTHY, *Primary Examiner.*

TOBIAS E. LEVOW, *Examiner.*

P. F. SHAVER, *Assistant Examiner.*

UNITED STATES PATENT OFFICE
CERTIFICATE OF CORRECTION

Patent No. 3,370,076            February 20, 1968

Hans Niederprüm et al.

It is certified that error appears in the above identified patent and that said Letters Patent are hereby corrected as shown below:

Column 2, line 71, "hexahydropthalic" should read -- hexahydrophthalic --. Column 4, line 52, "vicous" should read -- viscous --; line 53, "20°" should read -- 20° C. --; line 61, "200 mm." should read -- 20 mm. --. Column 5, line 23, "43 grams" should read -- 243 grams --. Column 7, line 6, "hydroxyakylmercaptomethyl" should read -- hydroxyalkylmercaptomethyl --.

Signed and sealed this 19th day of August 1969.

(SEAL)
Attest:

Edward M. Fletcher, Jr.            WILLIAM E. SCHUYLER, JR.
Attesting Officer                    Commissioner of Patents